United States Patent [19]

Thomas

[11] 3,717,753

[45] Feb. 20, 1973

[54] LIQUID SCINTILLATION SPECTROMETER WITH AUTOMATIC SETTING OF CHANNEL LIMITS

[75] Inventor: Edward Wherry Thomas, Morris Plains, N.J.

[73] Assignee: Intertechnique S.A., Plasir, France

[22] Filed: Oct. 1, 1969

[21] Appl. No.: 862,891

[52] U.S. Cl..............................235/151.3, 250/71.5
[51] Int. Cl...............................................G01t 1/20
[58] Field of Search ..................250/71.5; 235/151.3

[56] References Cited

UNITED STATES PATENTS

| | | | |
|---|---|---|---|
| 3,101,409 | 8/1963 | Fite | 250/71.5 |
| 3,381,130 | 4/1968 | Nather | 250/71.5 |
| 3,486,025 | 12/1969 | Brinkerhoff et al. | 235/151.3 X |

*Primary Examiner*—Malcolm A. Morrison
*Assistant Examiner*—Edward J. Wise
*Attorney*—Lane, Aitken, Dunner & Ziems

[57] ABSTRACT

This specification discloses a liquid scintillation spectrometer which analyzes a plurality of liquid scintillation test samples in sequence. The system measures the level of quenching in each sample and then measures the rate that scintillations are produced in selected ranges of intensities. The system sets the limits of the intensity ranges for each sample at values determined from the level of quenching found in such sample. A computer is used to determine the range limits from the level of quenching.

24 Claims, 6 Drawing Figures

INVENTOR
EDWARD WHERRY THOMAS

INVENTOR
EDWARD WHERRY THOMAS

LIQUID SCINTILLATION SPECTROMETER WITH AUTOMATIC SETTING OF CHANNEL LIMITS

BACKGROUND OF THE INVENTION

In many scientific and technical endeavours, the analysis of samples containing radioactive isotopes has become a useful tool. For example, in medical research and diagnosis, a radioactive isotope can be traced in the body by periodically taking samples from the body, such as urine or blood samples, after the isotope has been introduced into the body. In addition, the radioactive contamination of individuals can be measured by taking such samples from the contaminated individuals. In petroleum, hydraulic and sanitary engineering studies, the flow of ground water can be traced by introducing radioactive isotopes into the ground water and then taking samples of the ground water from different locations.

The analysis commonly is by means of liquid scintillation spectrometers, which are used to analyze beta activity and sometimes alpha activity. The samples to be analyzed are placed in vials containing a liquid scintillator. A vial containing the liquid scintillator and the radioactive material is referred to as a test sample. The liquid scintillator converts the radioactive decay events into light flashes having intensities corresponding to the energies of the decay events. The light flashes are then converted by a photomultiplier tube into pulses having amplitudes corresponding to the intensities of the light flashes. The resulting pulses are then applied to pulse height analyzers which only pass pulses falling in selected amplitude ranges, each analyzer being set to pass a different range of amplitudes. The amplitude ranges set by the pulse height analyzers are referred to as counting channels, which are defined by the pulse height analyzers. The pulse rates of the pulses in each counting channel are then measured by counting the pulses for predetermined time intervals. This process of analyzing test samples is referred to as "counting the test samples." The pulse rate determined will provide an indication of the rate that decay events are occurring in the test sample in the energy ranges corresponding to the amplitude ranges of the pulse height analyzers. This information can then be used to indicate the concentration of radioactive isotopes in the samples.

Because of chemical and light transmitting properties of the test samples, the intensity of the light flashes which reach the photomultiplier tube frequently do not correspond to the energy level of the decay events causing the light scintillation but actually may be substantially reduced in intensity. This reduction in intensity in the light scintillations is a phenomenon known as quenching. The amount of quenching, that is the degree of intensity reduction, will vary from test sample to test sample. Moreover, the quenching will result in the pulse rates detected in the different channels not being an actual reflection of the rate of decay events in the corresponding energy ranges. This problem of quenching has been overcome in the prior art systems by measuring the amount of quenching in each test sample and using this measurement to convert the pulse rate detected in each channel to reflect the actual rate of occurrence of decay events in the corresponding energy ranges.

One commonly used method of measuring the amount of quenching in a given sample is referred to as the external standard method, in which a source of penetrating radiation is brought into close proximity with the sample causing scintillations to occur in the sample and, accordingly, causing corresponding pulses to be produced by the system. The pulse rate which would be caused in one of the channels of the system by the standard in a test sample without quenching is known. Accordingly, the degree that the pulse rate caused by the external standard in this channel is below the rate which the standard would cause in a sample with no quenching will be an indication of the level of quenching in the test sample. By testing the standard with samples having known levels of quenching, the reduction in the pulse rate caused by the standard can be accurately calibrated to indicate the level of quenching. Since each test sample may also be producing scintillations as a result of the isotopes contained therein, to determine the pulse rate caused by the external standard, it is necessary to subtract the pulse rate in the selected channel produced by the sample alone from the pulse rate produced in this channel by the sample with the external standard source brought in close proximity thereto.

Another method of measuring the level of quenching in each test sample is referred to as the external standard channels ratio method. In this method, the pulse rate caused by an external standard in two different channels is measured in the manner described above and the ratio between these pulse rates is determined. This ratio will vary with the amount of quenching in each sample and upon being calibrated will provide a very good indication of the level of quenching in each sample.

Because it is often desirable to count a large number of test samples, it is desirable to have an apparatus which will count a large number of the samples in sequence automatically. Systems have been developed in the prior art which automatically advance each of a plurality of test samples in sequence to a counting station, measure the level of quenching in each sample at the counting station, measure the pulse rate produced by each test sample alone in a plurality of amplitude range channels, and record the results of these measurements for each sample. After each sample is counted in this manner at the counting station, the samples are automatically indexed, removing the preceding sample from the counting station and bringing a new sample to the counting station.

SUMMARY OF THE INVENTION

The system of the present invention operates to count a large number of test samples in sequence, measuring the level of quenching in each sample as in the above-described systems in the prior art. In the system of the present invention, however, the amplitude limits of the channels are automatically varied for each sample in accordance with the level of quenching in such sample. By varying the amplitude limits in one way, the "figure of merit" can be automatically maximized for each sample. The figure of merit is defined as $E^2/B$, in which E is the counting efficiency and B is the background count level in the channel. The counting efficiency is defined as the pulse rate produced in a given channel by an isotope in a sample divided by the overall rate that decay events are produced by the isotope. Alternatively, the amplitude limits of the counting channels can be varied to maintain the background count level constant for all levels of quenching. These and many other criteria can be satisfied by varying the amplitude limits of the counting channels automatically in accordance with the degree of quenching.

Accordingly, an object of the present invention is to provide an improved system for the analysis of test samples containing radioactive isotopes and having varying amounts of quenching.

Another object of the present invention is to provide an improved system for automatically analyzing in sequence a plurality of test samples containing one or more radioactive isotopes and having varying amounts of quenching.

A further object of the present invention is to provide a system for analyzing test samples containing radioactive isotopes with means for automatically varying the amplitude limits of counting channels in accordance with the level of quenching in each sample.

Further objects and advantages of the present invention will become readily apparent as the following detailed description unfolds and when taken in conjunction with the drawings.

DESCRIPTION OF THE PREFERRED EMBODIMENTS

Figure 1:
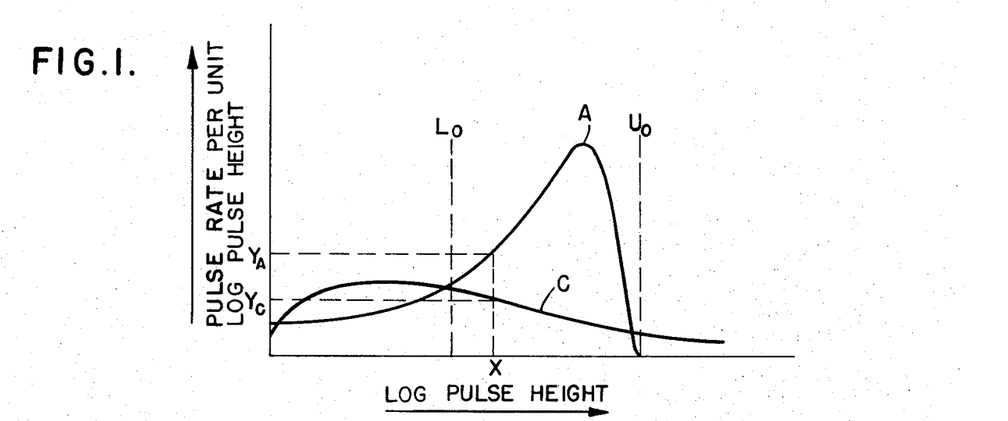
FIGS. 1 and 2 illustrate pulse height histograms produced by liquid scintillation test samples containing a radioactive isotope.
Figure 2:
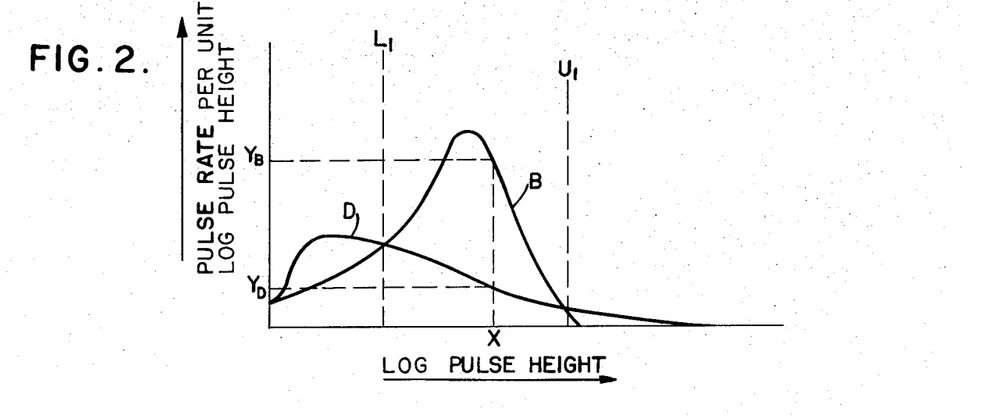

The advantages of the present invention will be more apparent from a consideration of the pulse height histograms or frequency distribution curves shown in FIGS. 1 and 2. In FIG. 1, the curve A represents the histogram of pulse heights produced by an isotope in a test sample with no quenching. Curve B in FIG. 2 represents the pulse height histogram produced by the same isotope in a quenched test sample on the same scale. Curves C and D represent the pulse height histograms produced by background noise in the quenched and unquenched samples, respectively, for the two samples. These curves show the rate of occurrence of pulses at each different amplitude over a small amplitude range. For example, at pulse height X, the isotope in the unquenched sample will produce a pulse rate of $Y_a$. The isotope in the quenched sample will produce a pulse rate of $Y_b$ at the pulse height X. The background noise will produce a pulse rate of $Y_c$ in the unquenched sample and a pulse rate of $Y_d$ in the quenched sample. Pulse height in FIGS. 1 and 2 are presented on a logarithmic scale.

Figure 3:
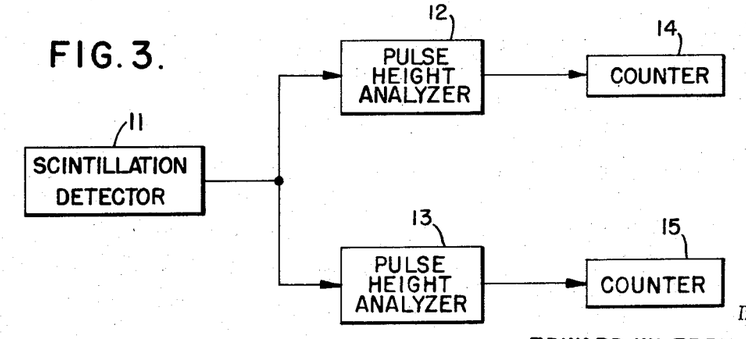
FIG. 3 is a simplified block diagram of a liquid scintillation spectrometer.

FIG. 3 is a block diagram illustrating a conventional liquid scintillation spectrometer for analyzing the test samples containing the radioactive isotopes such as the ones which produce the histograms illustrated in FIGS. 1 and 2. As shown in FIG. 3, a scintillation detector, which is designated by the reference number 11, will receive a test sample and will produce output pulses either proportional to or logarithmetically related to the intensity of light scintillations produced in the test sample depending upon the nature of the electronics in the detector 11.

In any event, the amplitudes of the pulses produced by the detector will be related to the intensities produced by the samples in accordance with a function which is the same for all the samples. The amplifiers and the coincidence circuitry normally found in the spectrometer have been eliminated from the showing in FIG. 3 for purposes of simplification and may be presumed to be part of the scintillation detector 11. The output pulses produced by the scintillation detector are applied to pulse height analyzers 12 and 13 each of which passes pulses in a predetermined amplitude range and thus set the amplitude limits of the channels in which the pulse rates are to be measured. Pulses passed by the pulse height analyzers are applied to counters 14 and 15, which are enabled to count the pulses applied thereto for preset time intervals and thus provide an indication of the pulse rates produced in the corresponding channels.

As pointed out above, it is often desirable to count samples in a manner to maximize the figure of merit, $E^2/B$. To maximize the figure of merit for a given channel for the unquenched sample, which has the distribution curve A in FIG. 1, the lower limit for the counting channel should be set at $L_0$, and the upper limit for the counting channel should be set at $U_0$. To maximize the figure of merit for the quenched sample, which has the distribution curve B shown in FIG. 2, both the upper and lower limits should be lowered to $L_1$ and $U_1$.

The amount that the upper and lower limits must be lowered to maximize the figure of merit will vary with the amount of quenching and can be determined experimentally by means of a series of samples, referred to as standard samples, having incrementally increasing known amounts of quenching and known activities. The upper and lower limits are determined for each standard sample to maximize the figure of merit for such standard sample. A graph can then be plotted showing the upper and lower limits of a channel to maximize the figure of merit as a function of the amount of quenching in the samples. From these graphs, the upper and lower limits to maximize the figure of merit, $E^2/B$ for any degree of quenching can be determined. For example, to maximize the figure of merit for a test sample being counted by the spectrometer shown in FIG. 3, the spectrometer is first used to measure the level of quenching in the test sample, such as by the external standard method or by the external standard channel ratio method. The upper and lower amplitude limits would then be determined from the graphs and the upper and lower limits of one of the pulse height analyzers would be set at the limits thus determined. The figure of merit would then be maximized for this test sample in the channel defined by this pulse height analyzer.

The distribution curves of FIGS. 1 and 2 are typical for test samples containing only one isotope. When more than one isotope is present and it is desirable to set each of a plurality of channels to count the decay events caused by different isotopes, the present invention can be used to great advantage to minimize spill over of decay events caused by one isotope into the channel which is supposed to be counting decay events caused by another isotope. As in the maximizing of the figure of merit, a series of standard samples are prepared with incrementally increasing amounts of quenching and containing known amounts of the plurality of isotopes expected to be found in the test samples. The upper and lower limits would then be determined for each of the channels to minimize spill over for each of the standard samples. For example, when just two isotopes are expected to be present, the upper limit of the channel counting the decay events of the lower energy isotope should be lowered with the increasing amounts of quenching as should the lower limit of the channel counting the higher energy isotope. Graphs can then be drawn from the data obtained from the standard samples plotting the lower and upper limits of the counting channels as a function of the amount of quenching to minimize spill over.

Another use of the present invention is to maintain the level of background count constant for all levels of quenching. The constant background count level can be achieved by maintaining the lower limit of a channel at a constant level and just moving the upper limit with increasing amounts of quenching. As in the maximizing of the figure of merit and the minimizing of the spill over, the upper amplitude limit is determined experimentally by means of two series of standard samples having incrementally increasing amounts of quenching. Since the characteristic of interest of the counting channel is background noise, one series of standard samples would not contain any isotopic activity. The other series of standard samples would contain activity of the isotope of interest and would be used to ensure that counting efficiency was maintained at a high level. It will be apparent that the amplitude limits of the channels may be varied with the level of quenching to satisfy many criteria. In each instance, the necessary amplitude limit variation with the amount of quenching can be determined experimentally and plotted as a graph. These graphs can also be represented by equations, the coefficients of which could be determined by the least square method or other convenient mathematical methods.

Figure 4:
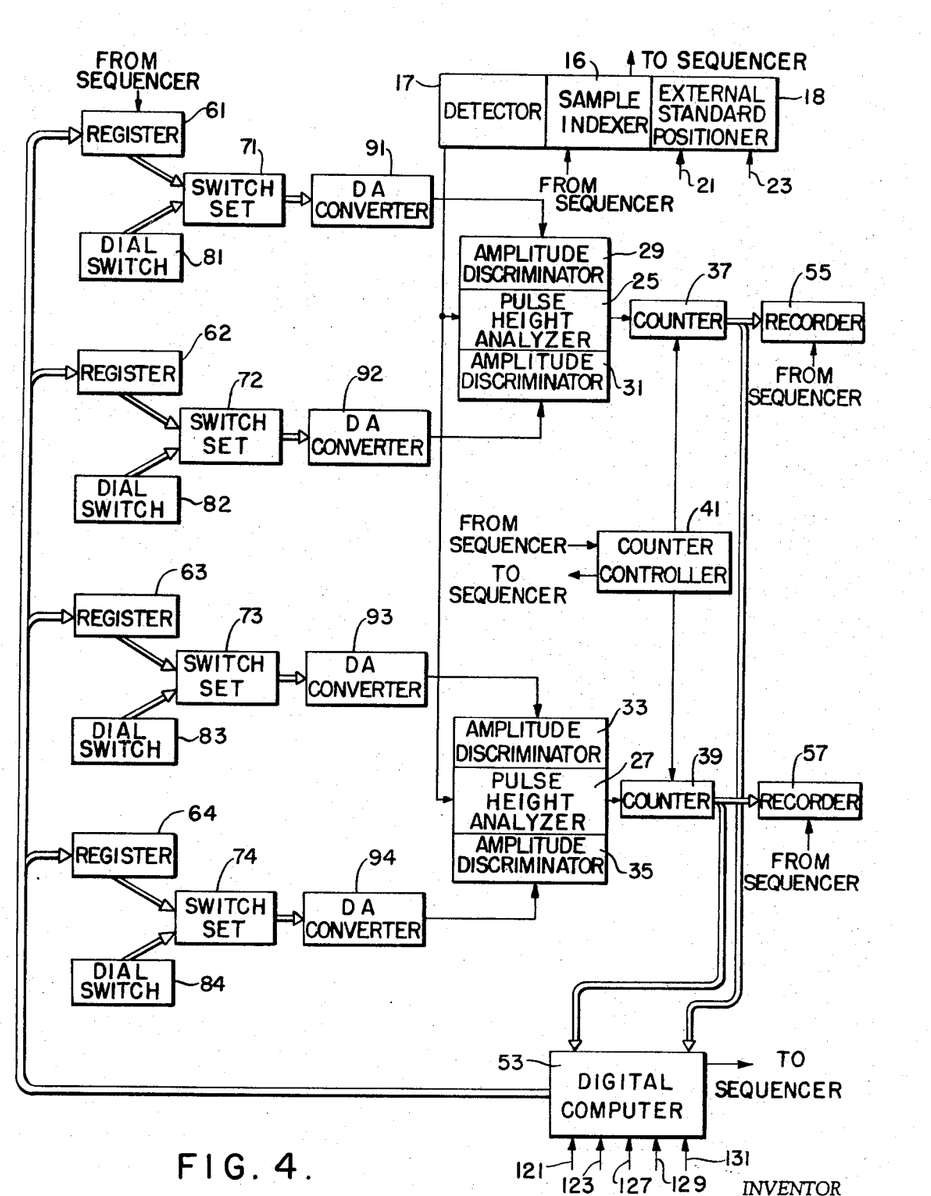
FIG. 4 is a block diagram illustrating the system of the present invention.

FIG. 4 illustrates the preferred embodiment of the system of the present invention, in which a series of samples are brought in sequence to a counting station, the level of quenching measured in each sample brought to the counting station, and then the amplitude limits of counting channels set automatically in accordance with the level of quenching thus measured to satisfy some criteria such as to maximize the figure of merit for the test sample, to minimize spill over, or to maintain a constant background noise level. In FIG. 4, the reference number 16 designates a sample indexing mechanism which in sequence brings test samples to a counting station and removes samples therefrom after they have been counted. The reference number 17 designates a scintillation detector located at the counting station, which converts the light scintillations produced by a sample at the counting station to pulses having amplitudes corresponding to the intensities of the light flashes. The detector 17 may include the conventional coincidence circuitry to eliminate spurious pulses and may include logarithmic amplification of the pulses if desired. Also, at the counting station, is an external standard positioner 18, which is operable to bring an external standard source of radioactivity in close proximity with the test sample at the counting station and to remove such external standard from this proximity to a remote position. The sample indexer and the external standard positioner 18 may be of the type disclosed in U.S. Pat. Nos. 3,188,468 and 3,257,561. The detector 17 may, for example, be of the type disclosed in U.S. Pat. No. 3,320,419.

In response to a signal applied to an input thereof, the sample indexer 16 will move the sample presently at the counting station from the counting station, then bring the next sample to the counting station, and then produce an output signal indicating that the new sample is in place at the counting station. The external standard positioner 18, in response to a signal applied to an input 21, will move the external standard source from a remote position to a position in close proximity with the sample at the counting station so as to produce light scintillations in the sample. The external standard positioner 18, in response to a signal applied to an input 23, will move the external standard source from the position of close proximity to a remote position.

The pulses produced by the detector 17, in response to the light scintillations generated in the test sample at the counting station, are applied to pulse height analyzers 25 and 27. The pulse height analyzer 25 will pass to its output only those pulses applied to its input which have amplitudes falling in a range between the amplitude limits set by amplitude discriminators 29 and 31. The pulse height analyzer 27 will pass to its output only those pulses applied to its input having amplitudes falling in a range between the limits set by amplitude discriminators 33 and 35. Pulses passing through the pulse height analyzer 25 are applied to a counter 37 and the pulses passing through the pulse height analyzer 27 are applied to a counter 39. The counters 37 and 39 are controlled by a counter controller 41, which in response to an applied signal will reset the count in the counters 37 and 39 to zero and enable the counters to count the pulses applied thereto from the pulse height analyzers. After a preset time delay, the controller 41 will disable the counters so that the counters will contain a count equal to the number of pulses produced by the detector 13 in the amplitude ranges set by the amplitude discriminators during the time interval set by the controller 41. Accordingly, the counts in the counters 37 and 39 will represent the pulse rates in these amplitude ranges. The controller 41 upon disabling the counters also produces an output signal indicating that the counting interval has been completed. The counter controller may be of the type disclosed in the U.S. Pat. No. 3,188,468.

Counters 37 and 39 are binary counters and produce binary output signals representing the counts contained therein. The binary output signals produced by the counters 37 and 39 are applied to a digital computer 53. The binary signals produced by the counter 39 are also applied to a recorder 55 and the binary signals produced by the counter 39 are applied to a recorder 57. Recorders 55 and 57, in response to applied signals, will record the applied binary signals. The digital computer 53 is operable to store the applied binary signals, and is also operable to compute from the applied binary signals the amplitude limits to be set by the amplitude discriminators 29, 31, 33 and 35 and apply digital signals representing these amplitude limits to registers 61 through 64. The computer 53 will compute from the applied binary signals the level of quenching in a given sample in a manner to be described below and then will produce digital output signals representing the amplitude limits for the discriminators 29, 31, 33 and 35 corresponding to the determined level of quenching to produce the desired criteria such as maximum figure of merit or constant background level in each of the two channels defined by the pulse height analyzers 25 and 27. The digital signal output of the computer 53 is applied simultaneously to all of the registers 61 through 64. Each of these registers in response to a signal applied thereto will store the applied binary signals. In this manner, the binary number output produced by the computer 53 may be stored in any one of the registers 61 through 64. Output signals representing the numbers as stored in the registers 61 through 64 are applied to sets of multiple switches 71–74, respectively, which also are connected to receive digital signals representing the setting of manual dial switches 81–84, respectively. The switch sets 71–74 will pass either the signals applied thereto from the registers 61–64, respectively, to its output or the digital signals representing the setting of the dial switches 81–84 to its output and will switch from one to the other in response to an applied signal. The output signals from the switch set 71–74 are applied to digital-to-analogue converters 91–94, respectively, which in response to the applied digital signals will produce a corresponding analogue signal. The output signal of the digital-to-analogue converter 91 is applied to the amplitude discriminator 29 which will set the upper amplitude limit for the pulse height analyzer 25 in accordance with this output signal. The digital-to-analogue converter 92 applies its analogue output signal to the amplitude discriminator 31, which in response to this applied signal will set the lower amplitude limit of the pulse height analyzer 25 at a level corresponding to the applied analogue signal. The limits of the amplitude discriminators 33 and 35 are controlled by the output signals of the digital-to-analogue converters 93 and 94, respectively, in a similar manner. An amplitude discriminator, which is controlled in this manner by an applied analogue signal, is disclosed in the text Nuclear Pulse Spectrometry by R. L. Chase, published by McGraw Hill, N.Y. (1961), pages 54–62.

To use the system of FIG. 4 to count a series of samples while automatically varying the amplitude limits on one or both of the counting channels as a function of the level of quenching in each sample to satisfy one or more selected criteria, the variation in the amplitude limits with quenching must be determined experimentally as has been described above. A series of standard samples are prepared having incrementally increasing amounts of quenching and known activities. Each standard sample is then placed in turn at the counting station in the detector 17 and the amplitude limits of one or both of the pulse height analyzers 25 and 27 as set by the corresponding amplitude discriminators are adjusted by means of the dial switches 81–84 for each standard sample until the criteria is satisfied for such sample. For example, if the criteria for the channel defined by the analyzer 25 is maximizing the figure of merit, the amplitude limits set by the discriminators 29 and 31 are adjusted by means of the dial switches 81 and 82 and the pulse rate in the channel defined by the pulse height analyzer 25 is measured after each adjustment until the figure of merit is maximized for such sample. The pulse rate is measured by actuating the counter controller 41 to reset the counter 37 to zero and enable it for a predetermined time interval. The amplitude limits thus determined for each standard sample are then recorded and from this data the coefficients of polynomial equations representing the amplitude limits as functions of the level of quenching are determined by the least square method. For example, the upper limit $L_u$ of the analyzer 25 set by the discriminator 29 might be represented by the following polynomial equation: $L_u = Aq^5 + Bq^4 + Cq^3 + Dq^2 + Eq + F$, in which $q$ is the level of quenching as would be indicated by the external standard method of measurement and $A, B, C, D, E$, and $F$ are the coefficients of the polynomial equation. The coefficients for each polynomial equation expressing the amplitude limits for each channel in which the sample is to be counted are determined in this manner and the coefficients are stored in the memory of the computer 53 to be used later to automatically set the amplitude limits for each test sample in the manner to be described below. Although a Fifth order equation has been used as an example, a lower order equation will generally suffice.

The curves which give the amplitude limits as functions of the level of quenching can be stored in other ways than by coefficients of the polynomial equations which represent these curves. Instead, the values of the points along the curves can be stored. The amplitude limits from a given level of quenching could then be determined by interpolation. In both, the instance in which the curves are represented by stored signals representing the coefficients of polynomial equations and the instance in which the curves are represented by stored signals representing points along the curves, the curves are represented by a relatively small number of values from which a much larger number of possible amplitude limit values for different levels of quenching can be arithmetically determined.

Figure 5:
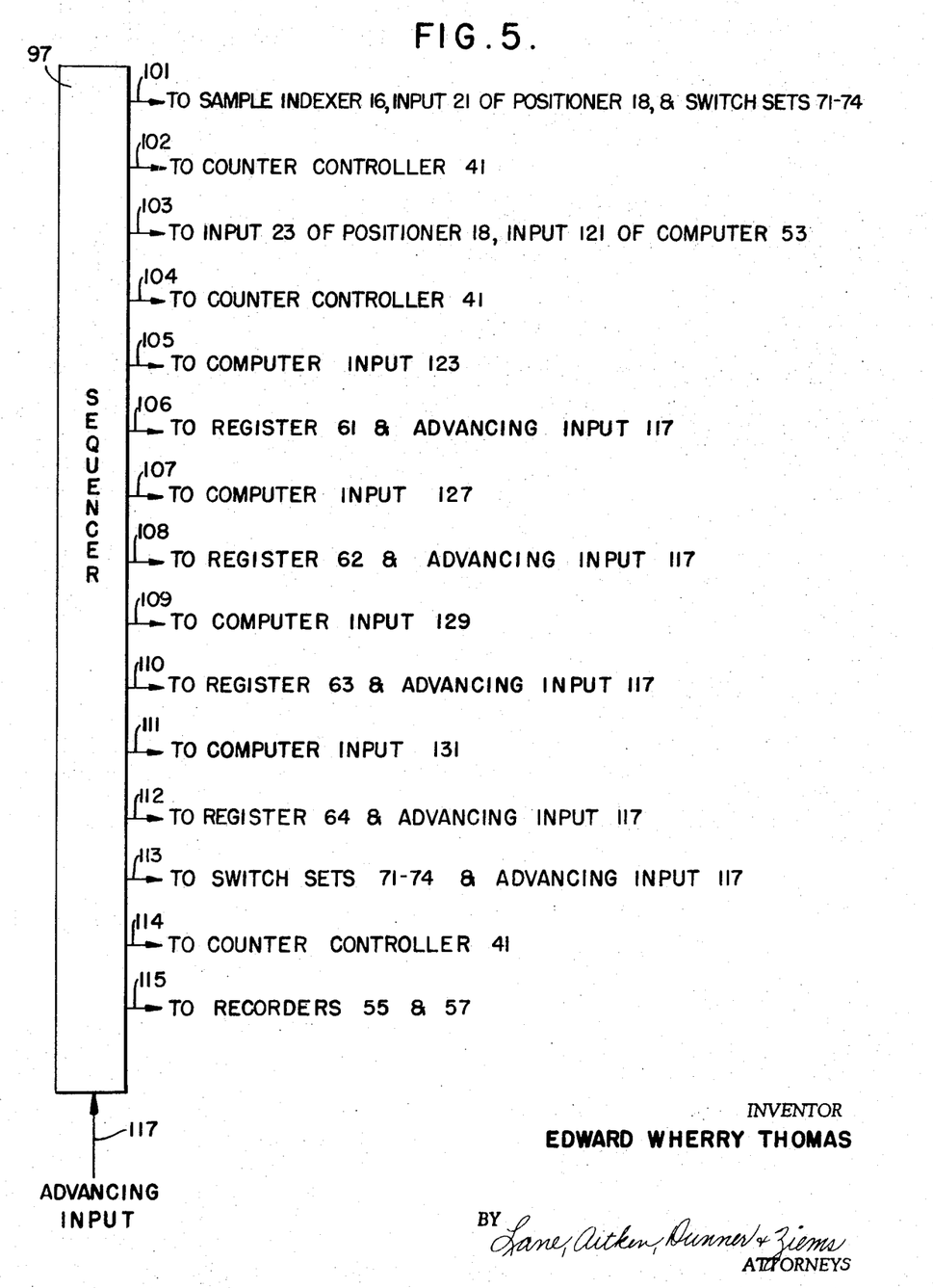
FIG. 5 schematically illustrates a device for automatically controlling the sequential operation of the system shown in FIG. 4; and, FIG. 6 is a block diagram of the computer used in the system of FIG. 4.

The operation of the system illustrated in FIG. 3 when being used to count a series of test samples while automatically varying the amplitude limits of the channels as a function of the amount of quenching is controlled by a sequencer which is illustrated in FIG. 5. The sequencer, which is designated by the reference number 97, produces output signals cyclically in sequence on a plurality of output channels 101 through 115 and produces an output signal from the next output channel in sequence in response to a signal being applied to an input 117 thereof referred to as the advancing input. To start the automatic counting of the test samples contained by the sample indexer 16, the sequencer is actuated causing it to produce an output signal on channel 101, from which the signal is applied to the sample indexer 16 causing it to bring the first sample to the counting station. The signal produced on channel 101 is also applied to the input 21 of the external standard positioner 18 to cause it to bring the external standard to a position to be in close proximity with the first sample at the counting station and cause scintillations to be produced in the first test sample. The signal produced on output channel 101 is also applied to the switches 71–74, which initially will have been set in the condition in which they connect the outputs of the registers 61–64 to the digital-to-analogue converters 91–94, and causes these switches to switch to the opposite condition in which they connect the output signals of the dial switches 81–84 to the inputs of the converters 91–94. As a result, the amplitude discriminators 29, 31, 33 and 35 will be set in accordance with the levels selected by the dial switches 81–84. The dial switches 81 and 82 are set to provide an amplitude range for the analyzer 25 so that the pulses passing through the analyzer 25 can be used to determined the amount of quenching in each sample in accordance with the external standard method as described above. When the first sample is properly positioned at the counting station, the sample indexer 11 will produce an output signal which is applied to the advancing input 117 of the sequencer 97 causing it to produce an output signal on the next output channel 102. This signal is applied to the counter controller 41 to cause it to initiate a counting sequence. In response to receiving the signal from channel 102 of the sequencer, the controller 41 will set the counter 37 to zero and enable the counter 37 to count for a predetermined time interval. Accordingly, a count will be registered in the counter 37 corresponding to the pulse rate produced by the detector 13 in the selected amplitude range when the external standard is positioned in close proximity to the first sample. The counter 39 will also be reset and enabled by the controller 41 but the counter registered therein is not used when the quenching is being determined by the external standard method. After the predetermined time interval, the controller 41 produces an output signal which is applied to the advancing input of the sequencer 97 to cause it to advance its output signal to the next output channel 103. This signal is applied to the input 23 of the external standard positioner 18 to cause it to remove the external standard from close proximity with the sample at the counting station to a remote position. The signal on output channel 103 is also applied to an input 121 of the computer 53 to cause it to store the binary number registered in the counter 37 in a predetermined storage location. When the computer has completed this operation, it will produce an output signal which will be applied to the advancing input of the sequencer 97 to cause it to advance its output signal to the next output channel 104. The signal produced by the sequencer 97 on output channel 104 is applied to the counter controller 41 to cause it again to reset the counter 37 to zero and enabling it again to count the pulses in the selected amplitude range for the predetermined time interval. Following the predetermined time interval, the controller 41 will apply a signal to the advancing input 117 of the sequencer 97 to cause it to advance its output signal to the next output channel 105. The signal produced on output channel 105 is applied to an input 123 of the computer 53 to cause it to first subtract the binary number represented by the signals applied thereto by the counter 37 from the number previously stored thereby in response to the signal applied on input 121 and to store the resulting difference in a predetermined storage location. This resulting difference will represent the amount of quenching in the first sample presently at the counting station. This determination of the amount of quenching is by the external standard method. After the computer has determined the amount of quenching in this manner, the computer will proceed to compute the upper threshold level for one counting channel from the stored digital signals representing the level of quenching of the test sample and from the stored coefficients of the polynomial equation expressing this threshold level as a function of the amount of quenching. The computer will then produce digital signals representing this upper amplitude level at its output which signals are applied to the registers 61–64. When the computer has completed this computation, it will produce an output which will be applied to the advancing input of the sequencer 97 to cause the output signal of the sequencer 97 to be advanced to the next channel 106. From output channel 106, the signal is applied to the register 61 to cause this register to store the applied binary signals. In this manner, the binary signals representing the upper amplitude limit of the first counting channel corresponding to the level of quenching in the first test sample are stored in the register 61. The signal produced on output channel 106 is also applied to the advancing input of the sequencer 97 to cause the sequencer 97 to advance its output signal to channel 107, from which the signal is applied to an input 127 of the computer 53 to cause the computer 53 to complete the lower amplitude limit of the first counting channel. The lower amplitude limit will be determined from the level of quenching in the first test sample as already determined by and stored in the memory of the computer 53 and from the coefficients of the polynomial equation expressing this lower amplitude limit as a function of the level of quenching. Binary signals representing this lower amplitude limit will then be produced at the output of the computer 53 and applied to the registers 61–64. When the computer has completed this computation, it will apply an output signal to the advancing input of the sequencer 97 to cause it to advance its output signal to the channel 108, from which the output signal is applied to the register 62 to cause the register 62 to store the applied digital signals. In this manner, binary signals representing the lower amplitude level of the counting channel defined by the analyzer 25 determined in accordance with the level of quenching of the first test sample stored in the register 61. The computer then computes the upper and lower threshold levels of the second counting channel in response to signals applied to inputs 129 and 131 applied from output channels 109 and 111 and stores binary signals representing these threshold levels in registers 63 and 64 in response to signals produced by the sequencer 97 on output channels 110 and 112, respectively, in a similar manner, the sequencer being advanced by output signals from the computer on the completion of the computation and by the output signal of the sequencer on channel 110. After the lower amplitude limit of the second counting channel has been stored in the register 64 in response to the output signal produced on channel 112 by the sequencer, the sequencer will advance its output signal to channel 113 in response to the output signal from channel 112 being applied to the advancing input thereof. The signal applied on output channel 113 is applied to the switches 71–74 to cause them to switch their inputs from the dial switches 81–84 to the registers 61–64 so that the digital-to-analogue converters 91-94 will receive the binary signals representing the numbers stored on the registers 61–64, respectively, and will produce analogue output signals representing these digital numbers, respectively. Accordingly, the upper and lower limits of the pulse height analyzers 25 and 27 will be set in accordance with the applied analogue signals from the digital-to-analogue converters 91–94 and in this manner the upper and lower limits of the first and second counting channels will be set in accordance with the level of quenching in the first sample. The output signal on channel 113 is applied to the advancing input of the sequencer 97 to cause it to advance its output signal to channel 114 from which the output signal is applied to counter controller 41 to cause it to reset the counters 37 and 39 to zero and enable the counters to count output pulses in the first and second counting channels for the predetermined interval set by the controller 41. As a result, counts will be registered in the first and second counters representing the pulse rates in the channels with the amplitude limits thereof set in accordance with the amount of quenching in the test sample. After the counters 37 and 39 have been enabled for the predetermined time interval, the controller 41 will apply a signal to the advancing input of the sequencer 97 to cause it to advance its output signal to the channel 115, from which the output signal is applied to the recorders 55 and 57 causing them to record the counts registered in the counters 37 and 39. In this manner, the counts of the pulse rates in the two channels for the first test sample are recorded by the recorders 55 and 57 with the amplitude limits of the two channels being automatically set in accordance with the quenching level in the first test sample. The output signal produced on channel 115 is also applied to the advancing input of the sequencer 97 to cause it to advance its output signal to channel 101 from which it is again applied to the sample indexer 11. In response to receiving this signal, the sample indexer 11 will remove the first test sample from the counting station and move the next test sample into the counting position. The output signal on channel 101 is also again applied to the input 21 of the external standard positioner 15 to cause it to move the external standard back to the position of close proximity and to the switches 71–74 to cause them to switch back to the dial switches 81–84. After the next test sample is positioned in the counting station, the sample indexer will apply a signal to the advance input of the sequencer 97 to cause it to advance its output signal to channel 102 and the operation will proceed as described above with respect to the first test sample so that the amplitude limits of the two counting channels are set in accordance with the quenching level in the second sample and the pulse rates in the two channels are recorded by the recorders 55 and 57. The sequencer 97 will cyclically continue to produce output pulses on its output channels 101–115 in this manner to record the pulse rates in the first and second channels for each of the samples in the sequence until all of the samples in the sample indexer have been counted, at which time the indexer 116 will apply a signal to the sequencer 97 to stop the advancing of its output signal and terminate operations of the system.

Figure 6:
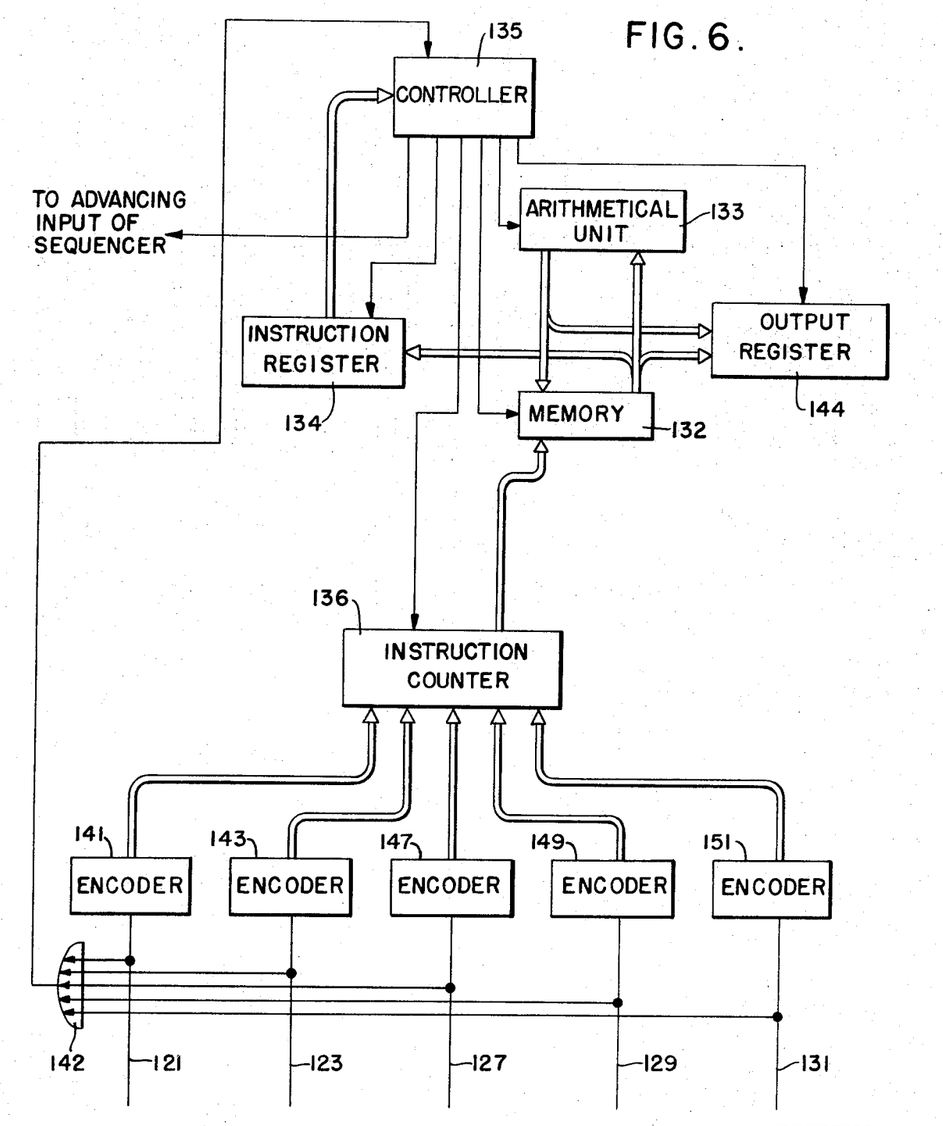

The digital computer 53, which comprises a conventional stored program computer, is shown in block form in FIG. 6. The computer comprises a memory 132, in which binary information can be stored; an arithmetical unit 133, which is capable of adding, subtracting and multiplying binary numbers; an instruction register 134, which is adapted to receive a program of instructions to be carried out by the computer; and a controller 135, which causes the computer to carry out the instruction presently stored in the instruction register. Instructions of a given program are sent in sequence to the instruction register from the memory under the control of an instruction counter 136. The instructions of each program to be carried out by the computer are stored at sequential addresses in the memory. To cause the computer to carry out a given program of instructions stored in the memory, a count representing the address of the first instruction of the program is set in the instruction counter and the controller 135 is actuated. The controller in response to being actuated will then cause the instruction to be read out from the memory location at the address stored in the instruction counter and causes this instruction to be stored in the instruction register. The controller will then act on the memory unit and arithmetic unit to carry out the instruction and at the same time will increment the instruction counter causing it to increase the count registered therein by one. After the instruction in the instruction register has been carried out, the controller will cause the instruction in the memory unit at the address represented by the count in the instruction counter to be read out and stored in the instruction register. Since the instruction counter has been incremented, this instruction will be read out from the next sequential address in the memory unit following the address at which the first instruction was stored. The controller then acts on the memory unit and the arithmetic unit to carry the new instruction in the instruction register and again increments the instruction counter to change the count registered therein to represent the address of the third instruction in the program being carried out. The controller continues to operate in this manner causing the instructions to be read out in sequence from the memory unit and then carrying out the instructions read out until all of the instructions of the program have been carried out by the computer. At the end of each program of instructions is an instruction in response to which the controller stops the operation of the computer and causes an output signal to be produced indicating that the program of instructions has been completed. This output signal is applied to the advancing input of the sequencer 97 to cause it to advance its output signal to the next output channel.

In the system of the present invention, several different programs are stored in the memory unit with instructions of each program being stored at sequential addresses in the memory unit. One of the programs consists merely of two instructions, the first of which will cause the binary number applied to the computer 53 from the counter 37 to be stored in a predetermined location in the memory unit. The second instruction of this program stops the operation of the computer and produces the output signal indicating that the program has been carried out. This program is the one which is caused to be carried out by the computer in response to the signal applied to the computer on input 121. The signal applied to input 121 is applied to an encoder 141, which in response to the applied signal on input 121 sets a count in the instruction counter 136 representing the address of the first instruction in the above described program. The signal applied on input 121 is also applied through an OR gate 142 to the controller 135 to cause it to start operation of the computer. In response to receiving the signal, the controller 127 reads out from the memory 132 the instruction at the address in the instruction counter and stores this instruction in the instruction register. The controller then proceeds to carry out the program in the manner described above. In this manner, the count registered by the counter 37 is stored in a predetermined location in the memory of the computer in response to a signal applied to the input 121 of the computer.

The signal applied to the input 123 of the computer is applied to an encoder 143, which in response to the signal applied on input 123 stores a count in the instruction counter 135 corresponding to the address of the first instruction of another program to be carried out by the computer. The signal applied on input 123 also passes through the OR gate 142 to the controller 135 to cause it to read out from the memory 132 the first instruction of the program at the address presently in the instruction counter 134, store this instruction in the instruction register 134, and carry out the program in the manner described above. In this program, the binary number applied to the computer from the counter 37 will be subtracted from the binary number stored at the predetermined location in response to the signal applied to the input 121 of the computer and store the results of the subtraction at another predetermined location. This number will then represent the amount of quenching in the sample presently at the counting station. The remaining instructions of the program carried out in response to the signal applied to the input 123 will be to compute the upper amplitude limit for the pulse height analyzer 25 from the coefficients of the polynomial equation expressing this limit as a function of quenching level. The coefficients of the polynomial equation will already have been stored at predetermined locations in the memory unit as has been described. When the computer has computed the amplitude level, an instruction of the program will cause the binary signals representing the amplitude level to be stored in an output register 144 from which the binary signals are applied to the registers 61–64, shown in FIG. 4. In this manner, the computer computes the upper amplitude limit of the pulse height analyzer 25 in accordance with the level of quenching in the test sample at the counting station.

The signal applied to the input 127 is applied to an encoder 147 to cause it to store a count in the instruction counter 136 corresponding to the address of the first instruction in the stored program of instructions which will cause the computer to carry out the computation of the lower amplitude limit for the channel defined by the pulse height analyzer 25. The signal applied to the input 127 is also applied through the OR gate 142 to the controller 135 to cause it to initiate the carrying out of this program of instructions. When the amplitude limit has been computed, the digital signals representing the amplitude level will be sent to the output register 144 from which they will be applied to the registers 61–64 as shown in FIG. 4. In this program of instructions, the level of quenching which already has been computed in response to the signal applied to the input 123 will be used to compute the amplitude limit.

The computations of the amplitude limits for the channel defined by the pulse height analyzer 27 are determined in a similar manner in response to the signals applied to inputs 129 and 131. Signals applied to the input 129 are applied to an encoder 149 which stores a count in the instruction counter 136 representing the address of the first instruction of the program for computing the upper amplitude limit for the channel defined by the pulse height analyzer 27. The signal applied to the input 131 actuates an encoder 151 to store in the instruction counter a count representing the address of the first instruction of the program for computing the lower amplitude limit for the channel defined by the pulse height analyzer 27. Signals applied to the inputs 129 and 131 are also applied through the OR gate 142 to the controller 135 to initiate the carrying out of the programs. Each of these programs, like the programs for computing the upper and lower limits for the channel defined by the pulse height analyzer 25, will cause the binary signals representing the computed amplitude limits to be stored in the output register 144 from which they will be applied to the registers 61–64.

In this manner, a computer computes the level of quenching for each test sample and computes the amplitude limits corresponding to the level of quenching determined for each of the counting channels. If one or more of the amplitude limits are to be maintained constant instead of being varied with the level of quenching, as might be done when it is desired to maintain a constant noise level in one of the channels, then the program instead of computing the amplitude limit from coefficients of a polynomial equation will merely read out the desired amplitude level from a predetermined location in the memory unit and store the amplitude level in the output register 144.

The system of the present invention is readily adaptable for using other methods of measuring the degree of quenching other than the external standard method. For example, the quenching could be measured by the external standard channels ratio method. In this method, counts from both the counters 37 and 29 would have to be taken and stored in the computer memory to determine the pulse rate due to the external standard in each of the two channels. The computer would then be programmed to determine the ratio between these two pulse rates to provide an indication of the degree of quenching in the test sample.

These and many other modifications may be made to the above described specific embodiment of the invention without departing from the spirit and scope of the invention, which is defined in the appended claims.

I claim:

1. A liquid scintillation spectrometer comprising means defining a station adapted to receive a plurality of liquid scintillation samples in sequence, means to convert the scintillations produced by said samples at said station into signals representing the intensity of the scintillations produced by such samples in accordance with a predetermined function which is the same for each of said samples, range defining means defining a range of intensities of scintillations produced by said samples, and storage means to store signals representing a curve which expresses a limit of said range as function of the level of quenching in said sample to satisfy a predetermined criteria, said system including control means to measure the level of quenching in the sample at said station and to set said limit of said range at the value corresponding to the measured level of quenching in accordance with said curve, said system further including means to measure the rate of occurrence of signals representing intensities in said range.

2. A liquid scintillation spectrometer as recited in claim 1 wherein the signals stored in said storage means represent a relatively small number of stored values which in turn represent said curve in a manner such that a much larger number of possible limit values can be arithmetically determined from said stored values for different levels of quenching, said control means including means to perform arithmetic operations on the level of quenching measured thereby and on said stored values in said storage means to determine the limit value corresponding to the level of quenching measured thereby in accordance with said curve and to set said limit of said range at the limit value thus determined.

3. A liquid scintillation spectrometer as recited in claim 2 wherein said stored values are coefficients of a polynomial equation defining said curve.

4. A liquid scintillation counter as recited in claim 2 wherein the signals stored in said storage means are digital signals and wherein said control means includes a digital computer to perform said arithmetic operations.

5. A spectrometer as recited in claim 1 wherein said storage means is operable to store signals representing a second curve expressing the other limit of said range as a function of a level of quenching in a sample to satisfy said predetermined criteria, said control means being operable to set said other limit at the value corresponding to the measured level of quenching in accordance with said second curve.

6. A liquid scintillation spectrometer as recited in claim 1 wherein said range defining means defines a second range of intensities of scintillations produced by said samples, said storage being operable to store signals representing a second curve expressing a limit of said second range as a function of the level of quenching to satisfy a predetermined criteria, said control means being operable to set said limit of said second range at the value corresponding to the measured level of quenching in accordance with said second curve, said rate measuring means being operable to measure the rate of occurrence of signals representing intensities in said second range.

7. A liquid scintillation spectrometer as recited in claim 1 wherein the said intensity representing signals comprise pulses having amplitudes corresponding to the intensities of said scintillations, wherein said range defining means defines a channel into which are passed only those pulses having amplitudes falling in a selected range of amplitudes, and wherein said control means sets at least one limit of said range of amplitudes at the value corresponding to the level of quenching in accordance with said curve.

8. A liquid scintillation spectrometer as recited in claim 1 wherein said control means includes means selectivity operable to position a standard source of radioactivity in close proximity with the sample at said station, means to measure the rate of signal occurrence having intensities in a predetermined range with said standard source of radiation in close proximity with the sample at said station and the rate of signal occurrence in said predetermined range when the standard source of radioactivity is remote from the sample at said station, and means to perform arithmetic operations on the rates thus measured to determine the level of quenching in the sample at said station.

9. A system for analyzing a source of light scintillations comprising means to convert scintillations produced by said source into signals representing the intensity of said scintillations, range defining means defining a range of intensities of scintillations produced by said source, and storage means to store signals representing a curve which expresses a limit of said range as a function of the level of quenching in said scintillation source to satisfy a predetermined criteria, said signals stored in said storage means representing a relatively small number of values which in turn represent said curve in a manner such that a much larger number of possible limit values can be arithmetically determined from said stored values for different levels of quenching, said system including control means to measure the level of quenching in said source of scintillations, perform arithmetic operations on the measured level of quenching and on said stored values to determine the limit value corresponding to the measured level of quenching in accordance with said curve, and set said limit of said range at the limit value thus determined, said control means further including means to measure the rate of occurrence of signals representing intensities falling in said range.

10. A system as recited in claim 9 wherein said stored values are coefficients of a polynomial equation defining said curve.

11. A system as recited in claim 9 wherein said stored signals are digital signals and wherein said control means includes a digital computer to perform said arithmetic operations.

12. A system as recited in claim 9 wherein said storage means is operable to store signals representing a second curve expressing the other limit of said range as a function of a level of quenching in a sample to satisfy said predetermined criteria, said control means being operable to set said other limit at the value corresponding to the measured level of quenching in accordance with said second curve.

13. A liquid scintillation spectrometer as recited in claim 9 wherein said range defining means defines a second range of intensities of scintillations produced by said source, said storage being operable to store signals representing a second curve expressing a limit of said second range as a function of the level of quenching to satisfy a predetermined criteria, said control means being operable to set said limit of said second range at the value corresponding to the measured level of quenching in accordance with said second curve, said rate measuring means being operable to measure the rate of occurrence signals representing intensities in said second range.

14. A system for analyzing a source of light scintillations comprising means to convert said scintillations into signals representing the intensities of said scintillations, channel defining means connected to receive signals produced by said converting means and defining a channel into which are passed only those of the received signals which represent intensities falling into a selected range, limit setting means to set at least one limit of said range in accordance with the value of an applied control signal, rate measuring means to measure the rate of occurrence of signals in said channel, a digital register operable to store a digital number, computing means responsive to the rate of occurrence in said channel measured by said rate measuring means to store digital numbers in said digital register derived from the rates of signal occurrence in said channel, and converter means responsive to the digital number stored in said digital register to apply a control signal to said limit setting means having a value corresponding to said digital number.

15. A system as recited in claim 14 wherein said computing means comprises a digital computer programmed to determine said digital number from a polynomial equation expressing a limit of said range as a function of the level of quenching in said source.

16. A system as recited in claim 14 further comprising manually settable means for producing digital output signals in accordance with the manual setting thereof and switch means operable to select either said register or said manually settable means and to apply digital signals from the selected one of said manually settable means and said register to said converter means, said converter means applying a control signal to said limit setting means corresponding to the digital number represented by the digital signals applied thereto.

17. A method of analyzing a source of scintillations comprising the steps of measuring the level of quenching in said source of scintillations, measuring the rate of occurrence of scintillations having intensities in a selected range of intensities, defining a curve to express a limit of said range as a function of the level of quenching in said source of scintillations to satisfy a predetermined criteria, storing signals representing a relatively small number of values representing said curve in such a manner that a large number of possible limit values can be arithmetically determined from said stored values for different levels of quenching, performing operations on said stored signals to determined arithmetically the limit value corresponding to the measured level of quenching in accordance with said curve, and setting said limit of said range at the limit value thus determined.

18. A method of analyzing a source of scintillations as recited in claim 17 wherein said stored signals are digital signals and wherein said arithmetic operations are programmed to be performed on said digital signals by a digital computer.

19. A method of analyzing a source of scintillations as recited in claim 17 wherein said stored signals represent coefficients of a polynomial equation defining said curve.

20. A method as recited in claim 17 further comprising defining a second curve to express the other limit of said range as a function of the level of quenching in said source of scintillations to satisfy said predetermined criteria, storing a second set of signals representing a relatively small number of values representing said curve in such a manner that a large number of possible limit values can be arithmetically determined from such stored values for different levels of quenching, performing operations on said second set of stored signals to determine arithmetically the limit value corresponding to the measured level of quenching in accordance with said second curve, and setting said other limit of said range at the limit value thus determined.

21. A method as recited in claim 20 wherein the predetermined criteria is maximized $E^2/B$ in which E is the rate of occurrence of scintillations in said range divided by the overall rate of occurrence of scintillations produced in said source by a radioactive isotope, and B is the background counting level in said range.

22. A method as recited in claim 17 wherein said predetermined criteria is the maintenance of the background counting level constant.

23. A method as recited in claim 17 further comprising measuring the rate of occurrence of scintillations having intensities in a second selected range of intensities, determining a second curve to express a limit of said second range as a function of the level of quenching in said source to satisfy said predetermined criteria, storing a second set of signals representing a relatively small number of values representing said second curve in such a manner that a large number of possible limit values can be arithmetically determined from such stored values for different levels of quenching, performing operations on said second set of stored signals to determine arithmetically the limit value corresponding to the measured level of quenching in accordance with said second curve, and setting said limit of said second range at the limit value thus determined.

24. A method as recited in claim 23 wherein said source contains at least two isotopes, wherein said ranges are each selected to contain scintillations caused by a different isotope, and wherein said predetermined criteria is minimized spill over of scintillations into each of said ranges caused by isotopes corresponding to a different range.

* * * * *